United States Patent
Kennedy

(10) Patent No.: US 8,353,038 B1
(45) Date of Patent: Jan. 8, 2013

(54) MONITORING AND MANAGING CHANGES TO NON-STRUCTURED STORAGE OF SYSTEM CONFIGURATION INFORMATION

(75) Inventor: Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1570 days.

(21) Appl. No.: 11/386,573

(22) Filed: Mar. 21, 2006

(51) Int. Cl.
*G06F 11/00* (2006.01)

(52) U.S. Cl. ............ 726/24; 726/22; 726/23; 726/26; 726/27; 726/28; 726/29; 726/30; 713/1; 713/2; 713/150; 713/154; 713/187; 713/188; 713/100; 713/164; 713/165; 713/166; 713/167; 715/255; 715/256; 715/299; 715/230; 715/231

(58) Field of Classification Search .............. 726/22–24, 726/26–30; 713/1–2, 150, 154, 187–188, 713/100, 164–167; 715/255–256, 229–235, 715/741; 707/1, 6–7, 9, 203
See application file for complete search history.

(56) References Cited

U.S. PATENT DOCUMENTS

| | | | | |
|---|---|---|---|---|
| 6,374,268 | B1 * | 4/2002 | Testardi ..................... | 707/205 |
| 6,850,943 | B2 * | 2/2005 | Teixeira et al. ............... | 707/10 |
| 7,340,775 | B1 * | 3/2008 | Tarbotton et al. ............. | 726/24 |
| 2003/0196103 | A1 * | 10/2003 | Edwards et al. ............. | 713/200 |
| 2004/0015712 | A1 * | 1/2004 | Szor ............................. | 713/200 |
| 2004/0216032 | A1 * | 10/2004 | Amitay et al. ............... | 715/500 |
| 2005/0004925 | A1 * | 1/2005 | Stahl et al. ................... | 707/100 |
| 2005/0114338 | A1 * | 5/2005 | Borthakur et al. ............ | 707/9 |
| 2005/0198692 | A1 * | 9/2005 | Zurko et al. .................. | 726/24 |
| 2006/0117056 | A1 * | 6/2006 | Havewala et al. ............ | 707/102 |
| 2006/0168660 | A1 * | 7/2006 | Edwards et al. .............. | 726/22 |
| 2007/0118559 | A1 * | 5/2007 | Christiansen et al. ....... | 707/104.1 |
| 2007/0180530 | A1 * | 8/2007 | Verma et al. ................. | 726/24 |

OTHER PUBLICATIONS

Weiqing Sun et al., "One-way Isolation: an effective Approach for Realizing Safe Execution Environments", pp. 1-18, Mar. 19, 2006.*
Developer Best Practices and Guidelines for Applications in a Least Privileged Environment. Sep. 2005. <http://msdn.microsoft.com/windowsvista/default.aspx?pull=/library/en-us/dnlong/html/AccProtVista.asp>, 3 pages.

\* cited by examiner

*Primary Examiner* — Edan Orgad
*Assistant Examiner* — Canh Le
(74) *Attorney, Agent, or Firm* — Brill Law Office; Jeffrey Brill

(57) ABSTRACT

A configuration information manager monitors attempts by processes to update non-structured storage of system configuration information, such as plain text files which contain system configuration information. When such an attempt is made, the configuration information manager makes a copy of the target file, and redirects the write operation to this copy. The configuration information manager then analyzes the process that did the writing, as well as the content that was written. If the process and/or the content is deemed to be suspicious, the changes will be logged and discarded, thus protecting the system. Should the changes be deemed legitimate, then the configuration information manager folds them into the real file, typically in an annotated manner, so as enable subsequent reversion of the changes as desired.

21 Claims, 2 Drawing Sheets

MONITORING AND MANAGING CHANGES TO NON-STRUCTURED STORAGE OF SYSTEM CONFIGURATION INFORMATION

TECHNICAL FIELD

This invention pertains generally to computer security, and more specifically to providing protection for non-structured storage of system configuration information, without preventing legitimate access.

BACKGROUND

Generally, computer operating system configuration information is stored in a structured manner, such that access thereto is controlled at a system level. However, in some systems, certain system configuration information is stored in an unstructured manner, such as a plain text file without access regulations. In Microsoft Windows®, the HOSTS file is one such example. The Windows HOSTS file allows for Domain Name Service ("DNS") override of domains to Internet Protocol ("IP") addresses. It is a plain text file, with each record appearing on a single line. Each record consists of an IP address in the form of xxx.xxx.xxx.xxx, followed by a textual domain name. Any attempt by an application to access the domain will be redirected to the corresponding IP address.

The Windows HOSTS file is a frequent target of attack for malicious code. This file is commonly abused by malicious code to deny security software access to its Internet locations, as well as by phishing schemes. This file is shared amongst all users and applications on the system, and there are many legitimate reasons to make changes to it. These facts, coupled with its "plain text" format, make protecting the HOSTS file very difficult. What is needed are methods, systems and computer readable media for providing protection for non-structured storage of system configuration information, without preventing legitimate access.

SUMMARY OF INVENTION

Computer-implemented methods, computer systems and computer-readable media monitor attempts by processes to update non-structured storage of system configuration information, such as plain text files which contain system configuration information. When such an attempt is made, a configuration information manager makes a copy of the target file, and redirects the write operation to this copy. The configuration information manager then analyzes the process that did the writing, as well as the content that was written. If the process and/or the content is deemed to be suspicious, the changes will be logged and discarded, thus protecting the system. Should the changes be deemed legitimate, then the configuration information manager folds them into the real file, typically in an annotated manner, noting information such as the time and day of the change, and the user and application responsible for it. This way, should an application later be determined to be malicious, or should a user or system administrator wish to undo the changes, the changes can be removed in a structured fashion.

The features and advantages described in this summary and in the following detailed description are not all-inclusive, and particularly, many additional features and advantages will be apparent to one of ordinary skill in the relevant art in view of the drawing, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depicts embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
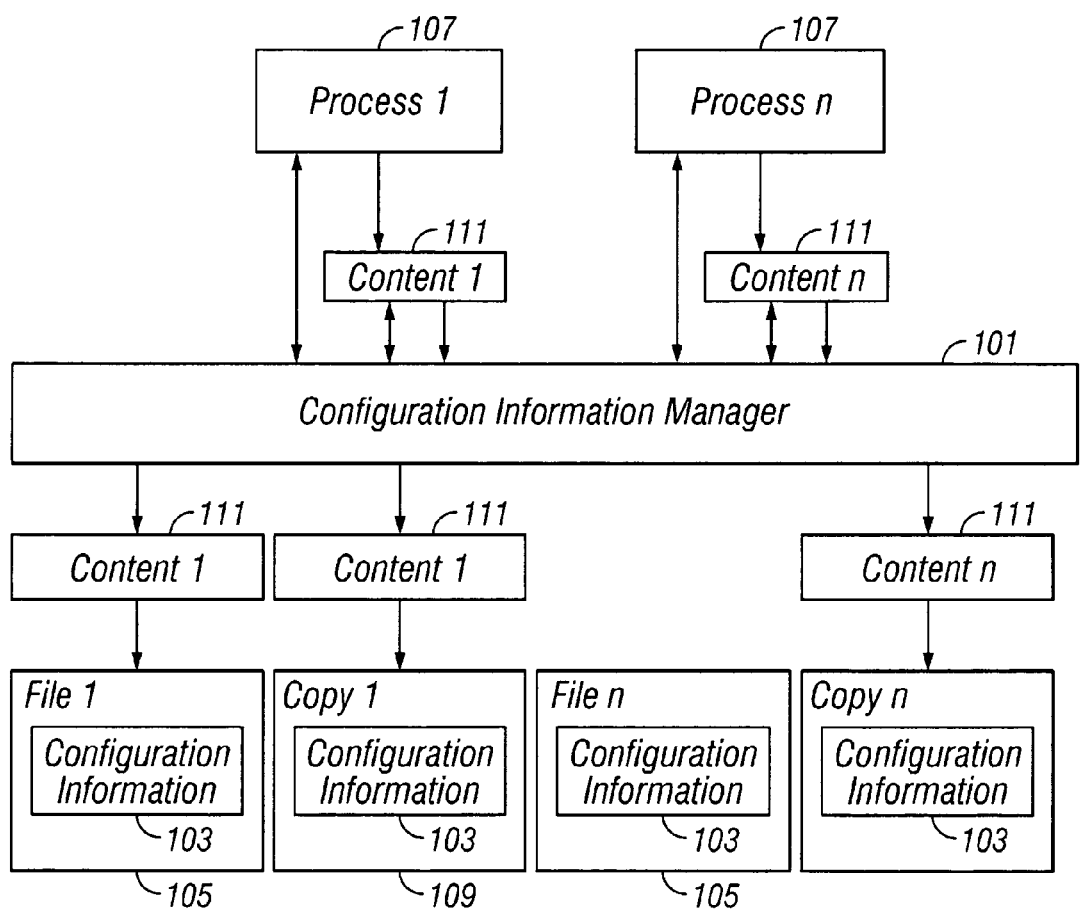
FIG. 1 is a block diagram illustrating a high level overview of the general operation of a configuration information manager, according to some embodiments of the present invention.

FIG. 1 illustrates a configuration information manager 101 protecting non-structured storage of system configuration information 103, according to some embodiments of the present invention. It is to be understood that although the configuration information manager 101 is illustrated as a single entity, as the term is used herein a configuration information manager 101 refers to a collection of functionalities which can be implemented as software, hardware, firmware or any combination of these. Where a configuration information manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the configuration information manager 101 protects non-structured storage of system configuration information 103, such as plain text files 105 that contain system configuration information 103. The configuration information manager 101 detects attempts by processes 107 to write to such files 105. Computer programming techniques for detecting attempts to write to specific files 105 and for controlling the subsequent processing are known to those of ordinary skill in the relevant art, and the implementation mechanics for applying such techniques within the context of the present invention will be readily apparent to those of ordinary skill in the relevant art in light of this specification. For example, in one embodiment system calls for write operations are intercepted, and if an intercepted call targets a file 105 of interest, a wrapper executes the desired functionality to manage the access. In other embodiments, the detection and management of attempts to write to files 105 of interest are handled by a file system filter driver. Other specific instantiations of the functionality described herein are also possible, and within the scope of the present invention.

It is to be understood that the specific file 105 or files 105 to monitor is a design choice, which can vary from embodiment to embodiment. For example, in some embodiments of the present invention, the configuration information manager 101 detects and manages attempts by processes 107 to write to some or all plain text files 105 that contain system configuration information 103. In other embodiments, the monitored files 105 are more narrowly defined, for example one or more files 105 that associate network addresses with domain names, such as the Windows HOSTS file 105. The present invention is not limited to any specific file 105, storage format or operating system.

When the configuration information manager 101 detects an attempt by a process 107 to write to a protected file 105, the configuration information manager 101 redirects the write operation to a copy 109 of the file 105. In different embodiments, the configuration information manager 101 can make an actual copy 109 of the file 105, or provide a default copy 109 as desired. The default copy 109 can comprise nothing more than a default file to which to direct the write operation. Providing the latter can make the subsequent analysis of the written content 111 easier. Regardless, the configuration information manager 101 analyzes the content 111 that was written to the copy 109 of the file 105, and the process 107 that performed the writing, in order to determine whether the update attempted by the process 107 is legitimate.

Analyzing the process 107 that wrote to the copy 109 can comprise operations such as checking whether the process 107 is on a list of known suspicious processes 107, scanning the process 107 for malicious code signatures, scanning the process 107 for suspicious heuristics and observing actions performed by the process 107 to check for suspicious activity. Other examples of process 107 analysis will be readily apparent to those of ordinary skill in the relevant art in light of this specification, and are within the scope of the present invention.

Analyzing the content 111 that was written by the process 107 can comprise operations such as determining whether the content 111 contains malicious code (e.g., by scanning the content 111 for relevant heuristics or signatures) or determining whether the content contains a network address that is known to be suspicious. Other examples of content 111 analysis will be readily apparent to those of ordinary skill in the relevant art in light of this specification, and are within the scope of the present invention.

The configuration information manager 101 determines whether to incorporate the content 111 that was written to the copy 109 into the file 105 based on the results of analyzing the written content 111 and the process 107 that did the writing. For example, the configuration information manager 101 can determine not to incorporate the content 111 into the file 105 responsive to determining that the process 107 is sufficiently suspicious, that the content 111 is sufficiently suspicious, and/or that a combination of the process 107 and the content 111 is sufficiently suspicious. On the other hand, the configuration information manager 101 can determine to incorporate the content 111 into the file 105 responsive to determining that neither the process 107 nor the content 111 are sufficiently suspicious.

In other words, if the configuration information manager 101 determines that under the totality of the circumstances the update to the system configuration information 103 appears legitimate, it allows the update to proceed. On the other hand, if the update appears to be malicious, the configuration information manager 101 blocks the update. It is to be understood that the threshold level that comprises "sufficiently suspicious" is a variable design parameter that can be adjusted up and down as a function of the desired balance between robustness of protection and ease of update access.

Figure 2:
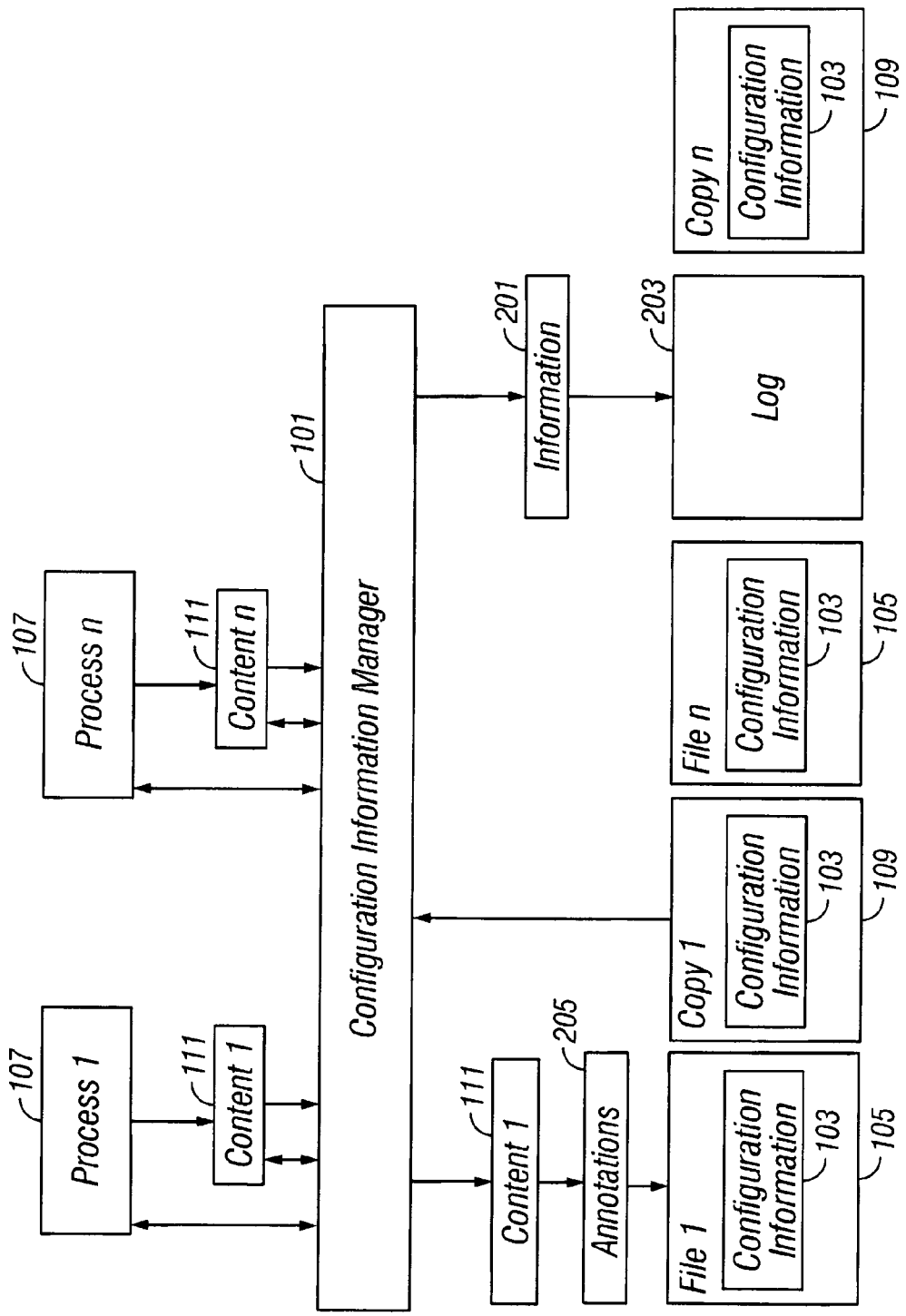
FIG. 2 is a block diagram illustrating a configuration information manager processing attempted changes to a configuration file, according to some embodiments of the present invention.

As illustrated in FIG. 2, where the configuration information manager 101 determines not to incorporate the content 111 into the file 105, the configuration information manager 101 can simply discard the copy 109, thereby preserving the original state of the file 105 and protecting the system. In some embodiments of the present invention, under these circumstances the configuration information manager 101 logs the attempt to write the content 111 to the file 105. The configuration information manager 101 can do this, for example, by writing relevant information 201 concerning the update attempt to a log file 203. The log 203 can be analyzed, e.g., to glean additional information regarding malicious code.

Where the configuration information manager 101 determines to incorporate the content 111 into the file 105, the configuration information manager 101 writes the content 111 to the file 105. In some embodiments, the configuration information manager 101 also writes annotations 205 to the file 105. The annotations 205 can identify information such as the day and time the change was made, and the user and process 107 that made the change. In such embodiments, if the configuration information manager 101 subsequently determines to back the content 111 out of the file 105, the configuration information manager 101 uses the annotations 205 to remove the content 111. The configuration information manager 101 can determine to do this in responsive to, for example, later determining that the process 107 or content is malicious, or receiving a directive from a user or a system administrator.

Computer programming techniques for annotating file updates are known to those of ordinary skill in the relevant art, and the implementation mechanics thereof within the context of the present invention will be readily apparent to those of such a skill level in light of this specification. For example, in some embodiments the annotations 205 are written to the file 105 as comments in a format supported by the specific file type (the Windows HOSTS file 105, for example, supports comments in the form of lines beginning with a # character).

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. As will be readily apparent to those of ordinary skill in the relevant art, any form of tangible computer readable storage medium can be used in this context, such as magnetic or optical storage media. As will be readily apparent to those of ordinary skill in the relevant art, as used herein, the term "computer readable storage medium" does not mean an electrical signal separate from an underlying physical medium. It will be further readily apparent to those of ordinary skill in the relevant art that the terms "computer system" and "computing device" means one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for protecting non-structured storage of system configuration information, the method comprising the steps of:
   detecting, by a computer, a plurality of attempts by a plurality of processes occurring over a period of time, each detected attempt comprising an attempt by a specific process of the plurality to write specific content to a specific file that contains system configuration information, wherein the specific content is executable;
   wherein over the period of time a plurality of attempts by a plurality of processes to write content to at least one file that contains system configuration information are detected;
   for each specific detected attempt by a specific process to write specific content to a specific file that contains system configuration information, redirecting, by a computer, the specific detected attempt to write content to a copy of the specific file that contains system information, such that the specific content is written to the copy of the specific file that contains system configuration information;
   for each specific redirected attempt by a specific process to write specific content to a specific file that contains system configuration information, analyzing, by a computer, the specific process and the specific content that was written to the copy of the specific file that contents system configuration information;
   for each specific redirected attempt by a specific process to write specific content to a specific file that contains system configuration information, determining, by a computer, whether to incorporate the specific content into the specific file responsive to results of analyzing the specific process and the specific content;
   wherein at least some specific analyzed content associated with at least one specific analyzed process is incorporated into at least one specific file that contains system configuration information and at least some specific analyzed content associated with at least one specific analyzed process is not incorporated into at least one specific file that contains system configuration information;
   responsive to determining to incorporate the specific content into the specific file, writing the specific content to the specific file, and writing annotations to the specific file identifying at least the specific process that performed the writing of the specific content to the specific file and when the writing of the specific content to the specific file was performed; and
   responsive to subsequently determining not to incorporate the specific content into the specific file, using the annotations to remove the specific content.

2. The method of claim 1 wherein analyzing, by a computer, the specific process further comprises:
   determining, by a computer, whether the specific process is on a list of known suspicious processes.

3. The method of claim 1 wherein analyzing, by a computer, the specific process further comprises:
   scanning, by a computer, the specific process for malicious code signatures.

4. The method of claim 1 wherein analyzing, by a computer, the specific process further comprises:
   observing, by a computer, actions performed by the specific process.

5. The method of claim 1 wherein analyzing, by a computer, the specific process further comprises:
   scanning, by a computer, the specific process for heuristics indicative of a malicious process.

6. The method of claim 1 wherein analyzing, by a computer, the specific content that was written to the copy of the specific file further comprises:
   determining, by a computer, whether the specific content contains malicious code.

7. The method of claim 1 wherein analyzing, by a computer, the specific content that was written to the copy of the specific file further comprises:
   determining, by a computer, whether the specific content contains a network address indicative of a malicious process.

8. The method of claim 1 wherein determining, by a computer, whether to incorporate the specific written content into the specific file responsive to results of analyzing the specific process and the specific content further comprises determining, by a computer, not to incorporate the specific content into the specific file, responsive to a criterion from a group of criteria consisting of:
   determining, by a computer, that the specific process is malicious;
   determining, by a computer, that the specific content is malicious; and
   determining, by a computer, that a combination of the specific process and the specific content is malicious.

9. The method of claim 1 wherein determining, by a computer, whether to incorporate the specific written content into the specific file responsive to results of analyzing the specific process and the specific content further comprises:
   determining, by a computer, to incorporate the specific content into the specific file, responsive to the specific process and the specific content being legitimate.

10. The method of claim 1 further comprising:
    responsive to determining, by a computer, not to incorporate the specific content into the specific file, logging, by a computer, the detected attempt to write specific content to the specific file and discarding the copy of the specific file containing the specific content.

11. The method of claim 1 wherein detecting, by a computer, the plurality of write attempts by the plurality of processes occurring over the period of time further comprises:
    detecting, by a computer, attempts by processes to write to a plain text file that associates network addresses with domain names.

12. The method of claim 11 wherein detecting, by a computer, the plurality of write attempts by the plurality of processes occurring over the period of time further comprises:
    detecting, by a computer, attempts by processes to write to a Windows HOSTS file.

13. The method of claim 1 wherein the copy of the specific file further comprises a file type from a group of file types consisting of:
    an actual copy of the specific file; and
    a default file to which to direct detected attempts to write specific content to the specific file.

14. At least one non-transitory computer readable storage medium storing a computer program product for protecting non-structured storage of system configuration information, the computer program product containing:
    program code for detecting a plurality of attempts by a plurality of processes occurring over a period of time, each detected attempt comprising an attempt by a specific process of the plurality to write specific content to a specific file that contains system configuration information, such that over the period of time a plurality of attempts by a plurality of processes to write content to at least one file that contains system configuration information are detected, wherein the specific content is executable;

program code for redirecting, for each specific detected attempt by a specific process to write specific content to a specific file that contains system configuration information, the specific detected attempt to write content to a copy of the specific file that contains system configuration information, such that the specific content is written to the copy of the specific file that contains system configuration information;

program code for analyzing, for each specific redirected attempt by a specific process to write specific content to a specific file that contains system configuration information, the specific process and the specific content that was written to the copy of the specific file that contains system configuration information;

program code for determining, for each specific redirected attempt by a specific process to write specific content to a specific file that contains system configuration information, whether to incorporate the specific content into the specific file responsive to results of analyzing the specific process and the specific content, such that at least some specific analyzed content associated with at least one specific analyzed process is incorporated into at least one specific file that contains system configuration information and at least some specific analyzed content associated with at least one specific analyzed process is not incorporated into at least one specific file that contains system configuration information;

responsive to determining to incorporate the specific content into the specific file, writing the specific content to the specific file, and writing annotations to the specific file identifying at least the specific process that performed the writing of the specific content to the specific file and when the writing of the specific content to the specific file was performed; and responsive to subsequently determining not to incorporate the specific content into the specific file, using the annotations to remove the specific content.

15. The computer program product of claim 14 further comprising program code for determining not to incorporate the specific content into the specific file, responsive to a criterion from a group of criteria consisting of:
   determining that the specific process is malicious;
   determining that the specific content is malicious; and
   determining that a combination of the specific process and the specific content is malicious.

16. The computer program product of claim 14 further comprising:
   program code for determining to incorporate the specific content into the specific file, responsive to the specific process and the specific content being legitimate.

17. The computer program product of claim 14 further comprising:
   program code for, responsive to determining not to incorporate the specific content into the specific file, logging, by a computer, the detected attempt to write specific content to the specific file and discarding the copy of the specific file containing the specific content.

18. A computer system for protecting non-structured storage of system configuration information, the computer system comprising:
   a processor;
   a memory;
   a component, in the memory, configured to detect a plurality of attempts by a plurality of processes occurring over a period of time, each detected attempt comprising an attempt by a specific process of the plurality to write specific content to a specific file that contains system configuration information, such that over the period of time a plurality of attempts by a plurality of processes to write content to at least one file that contains system configuration information are detected, wherein the specific content is executable;

a component, in the memory, configured to redirect, for each specific detected attempt by a specific process to write specific content to a specific file that contains system configuration information, the specific detected attempt to write content to a copy of the specific file that contains system configuration information, such that the specific content is written to the copy of the specific file that contains system configuration information;

a component, in the memory, configured to analyze, for each specific redirected attempt by a specific process to write specific content to a specific file that contains system configuration information, the specific process and the specific content that was written to the copy of the specific file that contains system configuration information; and a component, in the memory, configured to determine, for each specific redirected attempt by a specific process to write specific content to a specific file that contains system configuration information, whether to incorporate the specific content into the specific file responsive to results of analyzing the specific process and the specific content, such that at least some specific analyzed content associated with at least one specific analyzed process is incorporated into at least one specific file that contains system configuration information and at least some specific analyzed content associated with at least one specific analyzed process is not incorporated into at least one specific file that contains system configuration information, wherein the component configured to determine, responsive to determining to incorporate the specific content into the specific file, writing the specific content to the specific file, and writing annotations to the specific file identifying at least the specific process that performed the writing of the specific content to the specific file and when the writing of the specific content to the specific file was performed; and responsive to subsequently determining not to incorporate the specific content into the specific file, using the annotations to remove the specific content.

19. The computer system of claim 18, wherein the component configured to determine is further configured to determine not to incorporate the specific content into the specific file, responsive to a criterion from a group of criteria consisting of:
   determining that the specific process is malicious;
   determining that the specific content is malicious; and
   determining that a combination of the specific process and the specific content is malicious.

20. The computer system of claim 18, wherein:
   the component configured to determine is further configured to determine to incorporate the specific content into the specific file, responsive to the specific process and the specific content being legitimate.

21. The computer system of claim 18, wherein:
   the component configured to determine is further configured to log the detected attempt to write specific content to the specific file and to discard the copy of the specific file containing the specific content, responsive to determining not to incorporate the specific content into the specific file.

* * * * *